(12) United States Patent
Petrella

(10) Patent No.: US 7,738,930 B2
(45) Date of Patent: Jun. 15, 2010

(54) HINGE MECHANISM FOR A PORTABLE ELECTRONIC DEVICE

(75) Inventor: Thomas A. Petrella, Walworth, WI (US)

(73) Assignee: Motorola, Inc., Schaumburg, IL (US)

( * ) Notice: Subject to any disclaimer, the term of this patent is extended or adjusted under 35 U.S.C. 154(b) by 857 days.

(21) Appl. No.: 11/476,373

(22) Filed: Jun. 28, 2006

(65) Prior Publication Data

US 2008/0000048 A1  Jan. 3, 2008

(51) Int. Cl.
*H04M 1/00* (2006.01)
*E05D 7/00* (2006.01)
*E05D 1/00* (2006.01)
*E05D 7/04* (2006.01)

(52) U.S. Cl. .......................... 455/575.3; 16/221; 16/227; 16/233; 16/243

(58) Field of Classification Search .............. 455/575.3; 16/366, 221; 348/373
See application file for complete search history.

(56) References Cited

U.S. PATENT DOCUMENTS

| 5,325,984 | A   |   | 7/1994  | Ady et al. |         |
|-----------|-----|---|---------|------------|---------|
| 6,900,981 | B2  |   | 5/2005  | Kuivas     |         |
| 2004/0090552 | A1 | * | 5/2004 | Watanabe et al. | 348/373 |
| 2005/0120515 | A1 | * | 6/2005 | Kato       | 16/221  |
| 2006/0236505 | A1 | * | 10/2006 | Maatta et al. | 16/366 |

\* cited by examiner

*Primary Examiner*—Rafael Pérez-Gutiérrez
*Assistant Examiner*—Yungsang Lau
(74) *Attorney, Agent, or Firm*—Gary J. Cunningham

(57) ABSTRACT

A hinge mechanism (200) for a portable electronic device (100) is provided. The hinge mechanism includes a first shaft (202) that is capable of rotating about a first axis (206). The hinge mechanism also includes a second shaft (204) that is capable of rotating about a second axis (208), wherein the second axis in substantially parallel to the first axis. A link (210) connects the first shaft and the second shaft, wherein the link enables the first shaft and the second shaft to rotate in opposite directions.

20 Claims, 6 Drawing Sheets

HINGE MECHANISM FOR A PORTABLE ELECTRONIC DEVICE

FIELD OF THE DISCLOSURE

The disclosure relates in general to the field of portable electronic devices. More specifically, it relates to a hinge mechanism for a portable electronic device.

BACKGROUND OF THE DISCLOSURE

Portable electronic devices, for instance, mobile phones, personal digital assistants (PDAs), palmtops and laptops are becoming increasingly popular today. A portable electronic device with a flip opening feature generally has a first housing and a second housing. For example, in a flip mobile phone, the first housing may have a screen and a speaker, and the second housing a keypad and a microphone. Typically, these housings are connected to each other by a hinge mechanism. This hinge mechanism enables the first housing and the second housing to rotate with respect to each other about one or more axes.

Currently, there are various types of hinge mechanisms for a portable electronic device. In one such hinge mechanism, a spring connects the first housing and the second housing of a portable electronic device. The first housing and the second housing rotate about their clutch axles. These clutch axles are not mechanically linked to each other and therefore do not allow synchronized rotation of the first housing and the second housing.

In another hinge mechanism, the first housing and the second housing are connected with spur gears, which enable synchronized rotation. However, due to the large size of the spur gears, the hinge mechanism becomes bulky. Therefore, it cannot be used in small portable electronic devices. Further, the spur gears remain exposed to the environment and restrict rotation if they are covered with dust.

In light of the above discussion, there is a need for a hinge mechanism for a portable electronic device that provides synchronized rotation of a first housing and a second housing of the hinge mechanism. Further, the hinge mechanism should be compact in size.

SUMMARY OF THE DISCLOSURE

The present disclosure describes a hinge mechanism for a portable electronic device. The hinge mechanism includes a first shaft, a second shaft, and a link. The first shaft rotates about a first axis. The second shaft rotates about a second axis, which is substantially parallel to the first axis. The link connects the first shaft and the second shaft, such that it enables them to rotate in opposite directions.

The present disclosure also describes a portable electronic device. The portable electronic device includes a first housing, a first shaft, a second housing, a second shaft, and a link. The first housing rotates about a first axis. The first housing is coupled to the first shaft, which rotates about the first axis. The second housing rotates about a second axis, which is substantially parallel to the first axis. The second shaft, which rotates about the second axis, is coupled to the second housing. The link connects the first shaft and the second shaft. The link enables the movement of the first shaft and the second shaft in opposite directions, such that the movement of the first housing and the second housing is synchronized.

The present disclosure also describes a method in a portable electronic device. The method provides a hinge mechanism that is coupled to a first housing and a second housing of the portable electronic device. The first housing has a microphone and the second housing a speaker. The hinge mechanism has a first axis of rotation and a second axis of rotation. The second axis is parallel to the first axis. The method further synchronizes the rotation of the first housing and the second housing by using a link. This link is rotatably attached to a first shaft at a position offset to the first axis and to a second shaft at a position offset to the second axis.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
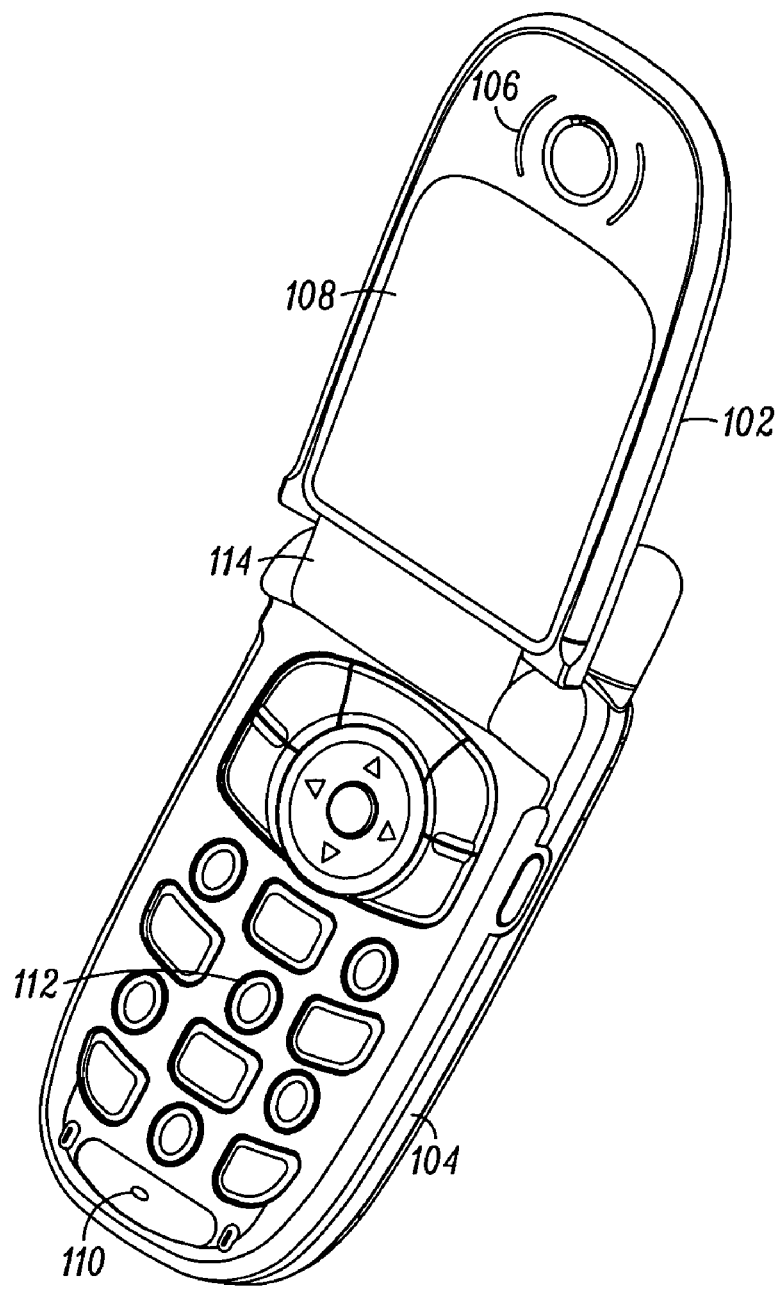
FIG. 1 illustrates an exemplary portable electronic device, where various embodiments can be practised.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

DETAILED DESCRIPTION

Before describing in detail the particular hinge mechanism for a portable electronic device in accordance with the present disclosure, it should be observed that the present disclosure resides primarily in combinations of apparatus components and method steps related to a hinge mechanism for a portable electronic device. Accordingly, the apparatus components and method steps have been represented where appropriate by conventional symbols in the drawings, showing only those specific details that are pertinent to understanding the present disclosure so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

A "set" as used in this document, means a non-empty set (i.e. comprising at least one member). The term "another", as used herein, is defined as at least a second or more. The terms "including" and/or "having", as used herein, are defined as comprising.

FIG. 1 illustrates an exemplary portable electronic device 100, where various embodiments can be practised. Though the portable electronic device 100 is shown as a flip mobile phone, it will be apparent to a person ordinarily skilled in the art that the portable electronic device 100 may be any portable electronic device other than the flip mobile phone. The portable electronic device 100 includes a first housing 102 and a second housing 104. The first housing 102 has a speaker 106 and a screen 108. The second housing 104, linked to the first housing 102, has a microphone 110 and a keypad 112. The first housing 102 and the second housing 104 are linked by a hinge mechanism enclosed in a hinge housing 114. This hinge mechanism enables the first housing 102 and the second housing 104 to rotate with respect to each other, achieve a flip-open to a flip-closed position, and vice versa. At the flip-open position, the first housing 102 and the second housing 104 can be '180' degrees apart. The first housing 102, at the flip-closed position, can be at '0' degrees with respect to the second housing 104.

Figure 2:
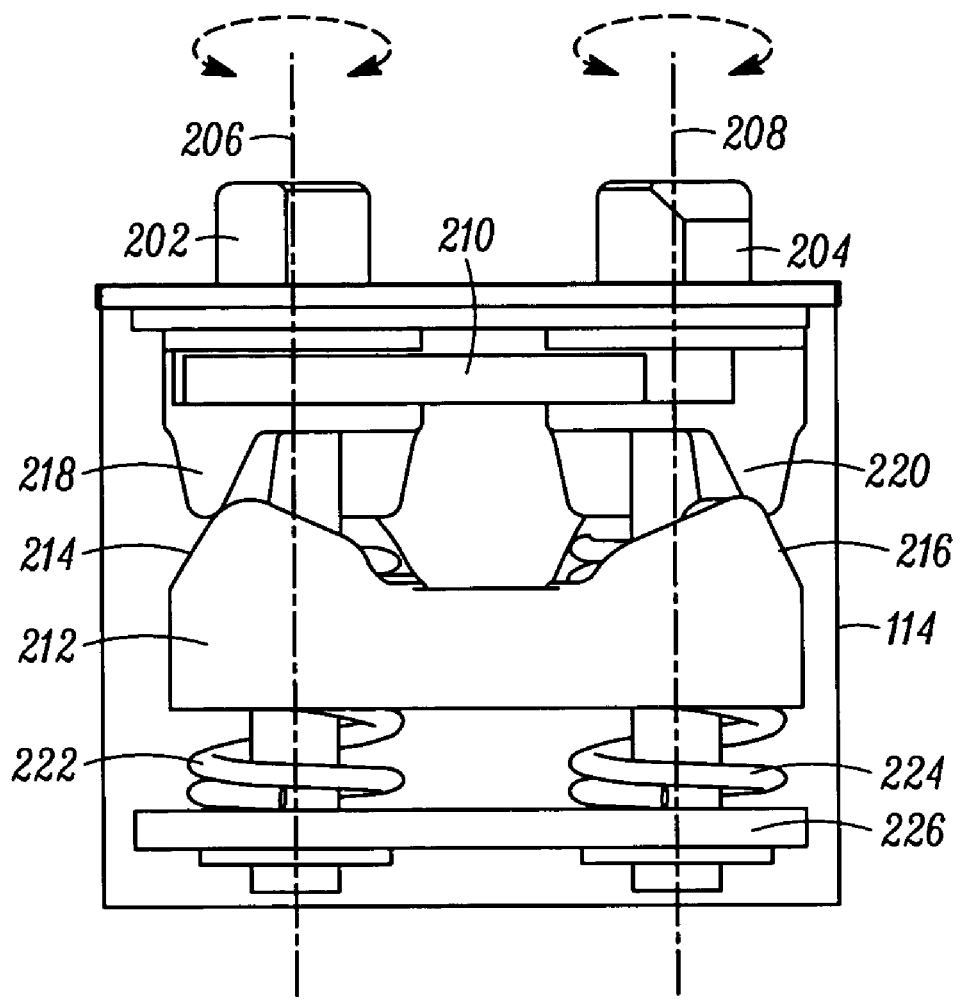
FIG. 2 illustrates a front view of a hinge mechanism, in accordance with an embodiment.

FIG. 2 illustrates a front-view of a hinge mechanism 200, in accordance with an embodiment. The hinge mechanism 200 includes a first shaft 202, a second shaft 204, and a link 210. The first shaft 202 rotates about a first axis 206, and the second shaft 204 about a second axis 208. The second axis 208 is substantially parallel to the first axis 206. In an embodiment, the first shaft 202 can be attached to the first housing 102, and the second shaft 204 can be attached to the second housing 104 of the portable electronic device 100. The link 210 connects the first shaft 202 and the second shaft 204. In an embodiment, the link 210 can be made of a material such as metal, plastic and cable. The link 210 is connected to the first shaft 202 at an offset position to the first axis 206. Further, the link 210 is connected to the second shaft 204 at an offset position to the second axis 208. This enables the first shaft 202 and the second shaft 204 to rotate synchronously in opposite directions. The first shaft 202 and the second shaft 204 clutch the first housing 102 and the second housing 104 at the flip-open and flip-closed positions. This is further illustrated in FIG. 5.

The hinge mechanism 200 further includes a cam 212, which reciprocates along the lengths of the first shaft 202 and the second shaft 204 when the first shaft 202 and the second shaft 204 rotate about their axes. The cam 212 has a first profile 214 and a second profile 216. The first profile 214 is movably coupled to a first tab 218 of the first shaft 202. The first profile is located around periphery of a first slot. The second profile 216 is movably coupled to a second tab 220 of the second shaft 204. The second profile is located around the periphery of a second slot. The rotation of the first tab 218 and the second tab 220 with respect to the first profile 214 and the second profile 216 enables the cam 212 to reciprocate. This is further illustrated in FIG. 4.

The hinge mechanism 200 also includes a first spring 222 and a second spring 224 inserted into the cam 212. It should be appreciated that the hinge mechanism 200 can have one or more springs. In an embodiment, the first spring 222 and the second spring 224 can be compression springs. The first spring 222 and the second spring 224 are placed between the cam 212 and a base 226. The base 226 can be perpendicular to the first axis 206 and the second axis 208. Further, the hinge mechanism 200 is enclosed in the hinge housing 114.

Figure 3:
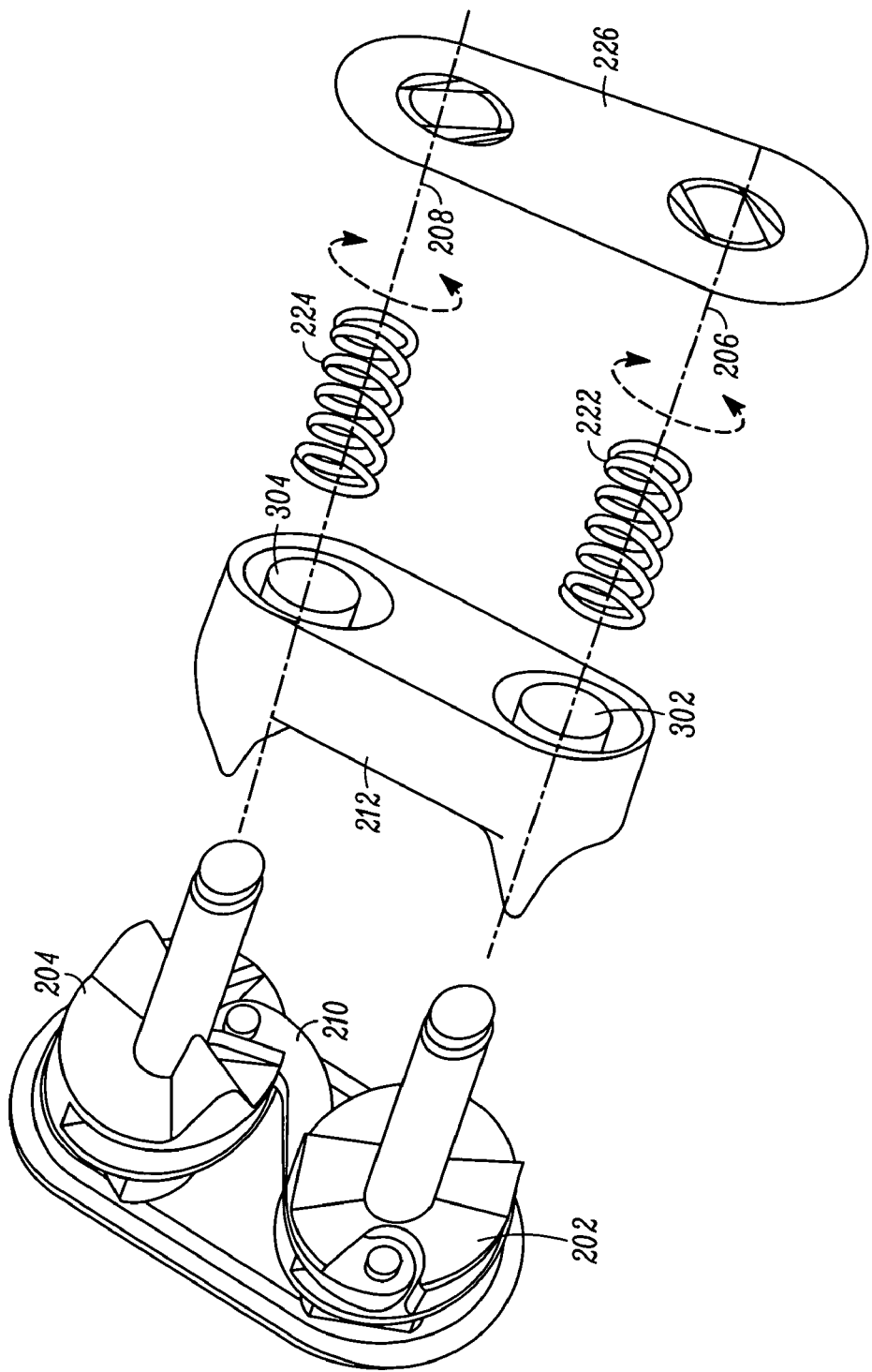
FIG. 3 illustrates an exploded view of a hinge mechanism, in accordance with an embodiment.

FIG. 3 illustrates an exploded view of a hinge mechanism 200, in accordance with an embodiment. The cam 212 includes a first slot 302 and a second slot 304. The first shaft 202 is inserted through the first slot 302 along the first axis 206. The second shaft 204 is inserted through the second slot 304 along the second axis 208. Thereafter, the first spring 222 is inserted into the first slot 302, and the second spring 224 is inserted into the second slot 304. The first spring 222 and the second spring 224 apply tension to the cam 212. The base 226 supports one end of the first spring 222 and the second spring 224.

Figure 4:
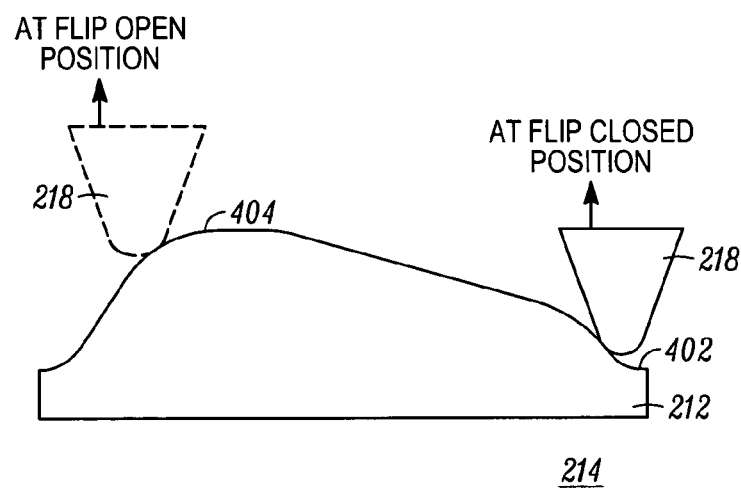
FIG. 4 illustrates a profile of a cam used in the hinge mechanism, in accordance with an embodiment.

FIG. 4 illustrates a first profile 214 of a cam 212 used in the hinge mechanism 200, in accordance with an embodiment. The first profile 214 has a first valley 402 and a first peak 404. The first profile 214 is around the periphery of the first slot 302. The first profile 214 is movably coupled to the first tab 218. The first tab 218 is positioned on the first shaft 202 offset to the first axis 206. As the first shaft 202 rotates, the first tab 218 moves along the first profile 214. When the first tab 218 rests in the first valley 402, the portable electronic device 100 is in the flip-closed position, and the first spring 222 is de-compressed between the cam 212 and the base 226. To attain the flip-open position, the first housing 102 and the second housing 104 are rotated such that the first tab 218 rests on the first peak 404. As the first tab 218 moves from the first valley 402 to the first peak 404, the cam 212 slides along the length of the first shaft 202, in response to the rotation of the first shaft 202, compressing the first spring 222. Similarly, the cam 212 slides along the length of the second shaft 204 in response to the rotation of the second shaft 204. The first tab 218 resting on the first peak 404, and the limit to which the first shaft 202 can rotate due to the link 210, results in a locking mechanism. This locking mechanism enables the first housing 102 and the second housing 104 to remain at a stable angle in the flip-open position. In an embodiment, the stable angle can be 180 degrees.

Figure 5:
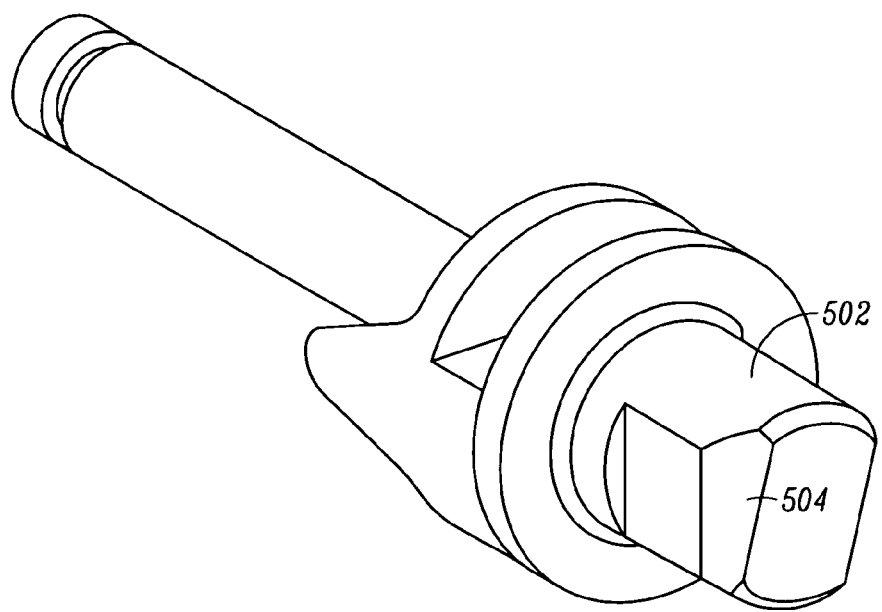
FIG. 5 illustrates the first shaft of the hinge mechanism, in accordance with an embodiment.

FIG. 5 illustrates the first shaft 202 of the hinge mechanism 200, in accordance with an embodiment. A shaft head 502 of the first shaft 202 has an inclined trim 504 and is sliced at an angle to structure the inclined trim 504. The inclined trim 504 can hold the first housing 102 at a first position and a second position. In an embodiment, the first position is the flip-open position and the second position is the flip-closed position. In an embodiment, the inclined trim 504 also enables the first spring 222 to drive the first shaft 202 completely into the first housing 102. This enables the first shaft 202 to rotate back to the first position. [For the inventor: Please confirm our understanding of the inclined trim 504.]

Figure 6:
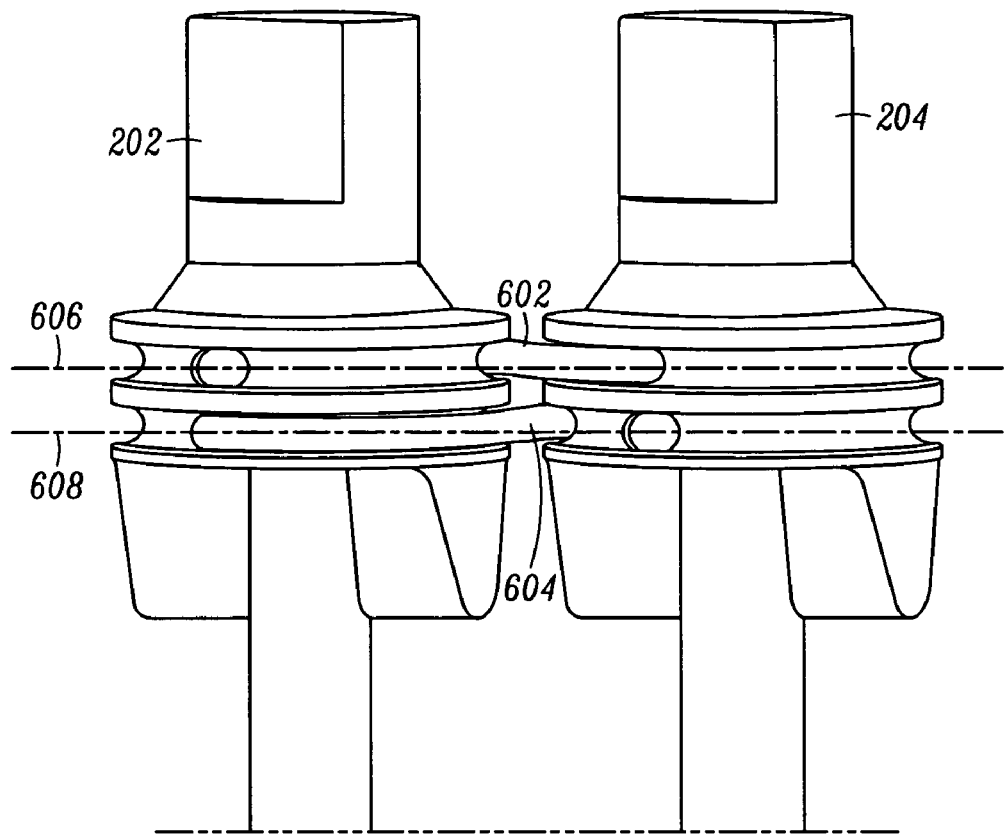
FIG. 6 illustrates a link between the first and second shaft of the hinge mechanism, in accordance with another embodiment.

FIG. 6 illustrates the link 210 between the first and second shafts of the hinge mechanism 600, in accordance with another embodiment. The hinge mechanism 600 includes the first shaft 202 and the second shaft 204, connected by the link 210. The link 210 can be one or more cables that connect the first shaft 202 and the second shaft 204. For example, the one or more cables can be a first cable 602 and a second cable 604. The first cable 602 and the second cable 604 are positioned on a plane 606 and a plane 608, respectively. The plane 606 and plane 608 are parallel to the base 226. The first cable 602 is positioned at an opposite offset position on the first shaft 202. The second cable 604 is positioned at an opposite offset position on the second shaft 204. The first cable 602 and the second cable 604 are positioned on the first shaft 202 and the second shaft 204, respectively, in a manner such that that they cross each other. During the rotation of the first shaft 202 and the second shaft 204, the first cable 602 and the second cable 604 transmit a force tangentially from the first shaft 202 to the second shaft 204, for example, in clockwise or anticlockwise rotation. This enables the first cable 602 and the second cable 604 to rotate the first shaft 202 and the second shaft 204 synchronously in opposite directions.

Figure 7:
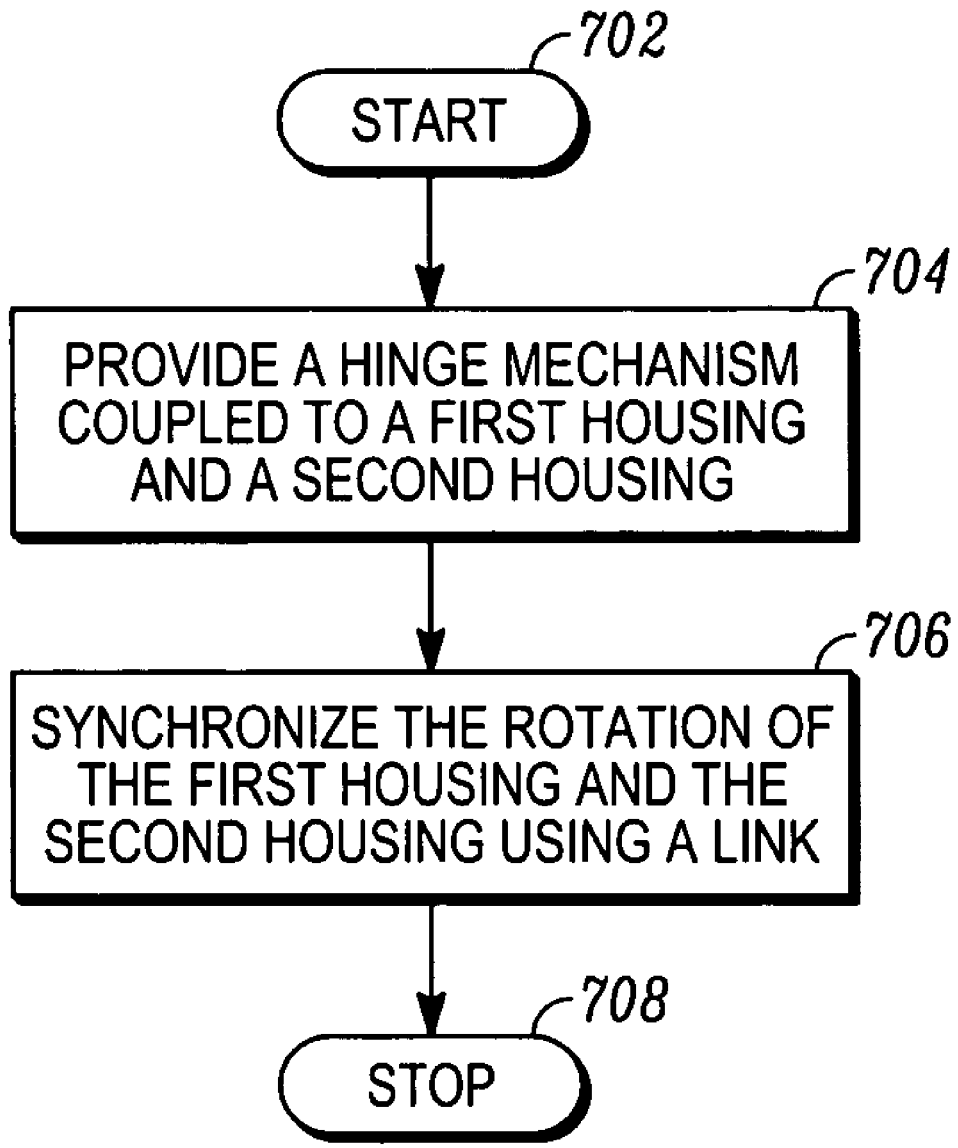
FIG. 7 is a flow diagram illustrating a method in a portable electronic device, in accordance with an embodiment.

FIG. 7 is a flow diagram illustrating a method in a portable electronic device 100, in accordance with an embodiment. The process is initiated at step 702. At step 704, the hinge mechanism 200, coupled to the first housing 102 and the second housing 104 of the portable electronic device 100, is provided. The first housing 102 includes the speaker 106 and the screen 108. The second housing 104 includes the microphone 110 and the keypad 112. The hinge mechanism 200 has the first axis 206 and the second axis 208 of rotation, which is parallel to the first axis 206. At step 706, the rotation of the first axis 206 and the second axis 208 is synchronized by using the link 210. The link 210 is rotatably attached to the first shaft 202 at a position offset to the first axis 206. The link 210 is rotatably attached to the second shaft 204 at a position offset to the second axis 208. The link 210 synchronizes the rotation of the first housing 102 with respect to the second housing 104.

The embodiments of the hinge mechanism for the portable electronic device described herein offer the following advantages. First, the opposite rotation of shafts is synchronized and achieves the synchronized opening and closing of the first and second housings. Second, the components of the hinge mechanism do not extend beyond the hinge housing and are less bulky, which makes the mechanism usable in small portable electronic devices. Third, the hinge mechanism has fewer components, which make it easier to assemble. Fourth, the components of the hinge mechanism are enclosed within a hinge housing, which protects the components from damage.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the disclosure and its benefits and advantages have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A portable electronic device comprising:
   a first housing;
   a speaker coupled to the first housing;
   a first shaft coupled to the first housing, the first shaft capable of rotating about a first axis;
   a second housing;
   a microphone coupled to the second housing;
   a second shaft coupled to the second housing, the second shaft capable of rotating about a second axis, wherein the second axis is substantially parallel to the first axis;
   a link connecting the first shaft and the second shaft, wherein the link enables the first shaft and the second shaft to rotate in opposite directions; and
   a cam having a first slot and a second slot, wherein the first shaft is inserted through the first slot along the first axis, and the second shaft is inserted through the second slot along the second axis, the cam includes a first profile around a periphery of the first slot, the first profile including a peak and a valley and a second profile around a periphery of the second slot, the second profile including a peak and a valley, the first shaft includes a first tab offset from the first axis, the first tab movably coupled to the first profile so as to move the cam with respect to the peak and the valley of the first profile and the second shaft includes a second tab offset from the first axis, the second tab movably coupled to the second profile so as to move the cam with respect to the peak and the valley of the second profile, wherein the cam slides along the first shaft and the second shaft in response to rotation of the first shaft and the second shaft, wherein the first tab rests on the first peak, and a limit to which the first shaft can rotate is provided by the link, providing a stable angle when in a flip-open position.

2. The portable electronic device as recited in claim 1, wherein the link is connected to the first shaft at a position offset to the first axis.

3. The portable electronic device as recited in claim 2, wherein the link is connected to the second shaft at a position offset to the second axis.

4. The portable electronic device as recited in claim 1, wherein a shaft head of the first shaft and a shaft head of the second shaft are sliced at an angle with respect to the first and the second axis, the angle enables the hinge mechanism to be held at a first position and at a second position.

5. The portable electronic device as recited in claim 1, further comprising a base along a plane that is substantially 90 degrees to the first axis and the second axis.

6. The portable electronic device as recited in claim 5, further comprising one or more springs positioned between the cam and the base.

7. The portable electronic device as recited in claim 1, wherein the hinge mechanism is enclosed in a hinge housing.

8. The portable electronic device as recited in claim 1, wherein the link is made of at least one of a metal, a plastic, and a cable.

9. The portable electronic device as recited in claim 1, wherein the link can be one or more cables, the one or more cables enable the first shaft and the second shaft to rotate in opposite directions.

10. The portable electronic device as recited in claim 9, wherein each of the one or more cables connected to the first shaft and the second shaft are positioned on planes at opposite offset positions.

11. A portable electronic device comprising:
    a first housing suitable for rotating about a first axis;
    a first shaft coupled to the first housing, wherein the first shaft rotates about the first axis;
    a second housing rotating about a second axis, wherein the second axis is substantially parallel to the first axis;
    a second shaft coupled to the second housing, wherein the second shaft rotates about the second axis;
    a link connecting the first shaft and the second shaft, wherein the link enables the movement of the first shaft and the second shaft in opposite directions, and wherein the link synchronizes the movement of the first housing and the second housing; and a cam having a first slot and a second slot, wherein the first shaft is inserted through the first slot along the first axis, and the second shaft is inserted through the second slot along the second axis, the cam includes a first profile around a periphery of the first slot, the first profile including a peak and a valley and a second profile around a periphery of the second slot, the second profile including a peak and a valley, the first shaft includes a first tab offset from the first axis, the first tab movably coupled to the first profile so as to move the cam with respect to the peak and the valley of the first profile and the second shaft includes a second tab offset from the first axis, the second tab movably coupled to the second profile so as to move the cam with respect to the peak and the valley of the second profile, wherein the cam slides along the first shaft and the second shaft in response to rotation of the first shaft and the second shaft, wherein the first tab rests on the first peak, to provide a stable angle when in a flip-open position.

12. The portable electronic device as recited in claim 11, wherein a shaft head of the first shaft and a shaft head of the second shaft are sliced at an angle with respect to the first and the second axis, the angle enabling the first and the second housing to be held at a first position and at a second position.

13. The portable electronic device as recited in claim 11, further comprising a locking mechanism that enables locking the first housing and the second housing at an angle to each other.

14. The portable electronic device as recited in claim 13, wherein the angle varies from zero to 180 degrees.

15. The portable electronic device as recited in claim 13, further comprising a base, wherein the base is located in a plane that is substantially 90 degrees to the first axis and the second axis.

16. The portable electronic device as recited in claim 15, further comprising one or more springs positioned between the cam and the base.

17. The portable electronic device as recited in claim 11, wherein the link can be one or more cables, the one or more cables enable the first shaft and the second shaft to rotate in opposite directions.

18. The portable electronic device as recited in claim 17, wherein each of the one or more cables connected to the first shaft and the second shaft are positioned on planes at opposite offset positions.

19. A method in a portable electronic device comprising:
providing a hinge mechanism coupled to a first housing and a second housing of the portable electronic device, the first housing including a microphone and the second housing including a speaker, the hinge mechanism including a first axis of rotation and a second axis of rotation, the second axis being parallel to the first axis;
providing a cam having a first slot and a second slot, wherein the first shaft is inserted through the first slot along the first axis, and the second shaft is inserted through the second slot along the second axis, the cam includes a first profile around a periphery of the first slot, the first profile including a peak and a valley and a second profile around a periphery of the second slot, the second profile including a peak and a valley, the first shaft includes a first tab offset from the first axis, the first tab movably coupled to the first profile so as to move the cam with respect to the peak and the valley of the first profile and the second shaft includes a second tab offset from the first axis, the second tab movably coupled to the second profile so as to move the cam with respect to the peak and the valley of the second profile, wherein the cam slides along the first shaft and the second shaft in response to rotation of the first shaft and the second shaft, wherein the first tab rests on the first peak, to provide a stable angle when in a flip-open position; and
synchronizing the rotation of the first housing and the second housing a link rotatably attached to a first shaft at a position offset to the first axis and rotatably attached to a second shaft at a position offset to the second axis.

20. The method of claim 19, wherein the first housing includes a keypad and the second housing includes a screen.

* * * * *